(No Model.)

W. FORREST.
EDUCATIONAL INSTRUMENT.

No. 305,585. Patented Sept. 23, 1884.

Witnesses.
Lewis Tomlinson
Chas. C. Baldwin

Inventor.
William Forrest
by Donald C. Ridout & Co.
Attorneys

UNITED STATES PATENT OFFICE.

WILLIAM FORREST, OF BRADFORD, ONTARIO, CANADA.

EDUCATIONAL INSTRUMENT.

SPECIFICATION forming part of Letters Patent No. 305,585, dated September 23, 1884.

Application filed August 22, 1883. (No model.) Patented in Canada September 10, 1883, No. 17,613.

*To all whom it may concern:*

Be it known that I, WILLIAM FORREST, of the village of Bradford, in the county of Simcoe, in the Province of Ontario, Canada, have invented a certain new and useful Educational Instrument; and I do hereby declare that the following is a full, clear, and exact description of the same.

The object of the invention is to produce an educational instrument to assist a teacher in giving instruction in spelling and reading; and it consists in the peculiar combinations and the construction and arrangement of parts hereinafter more fully described and claimed.

Figure 1:
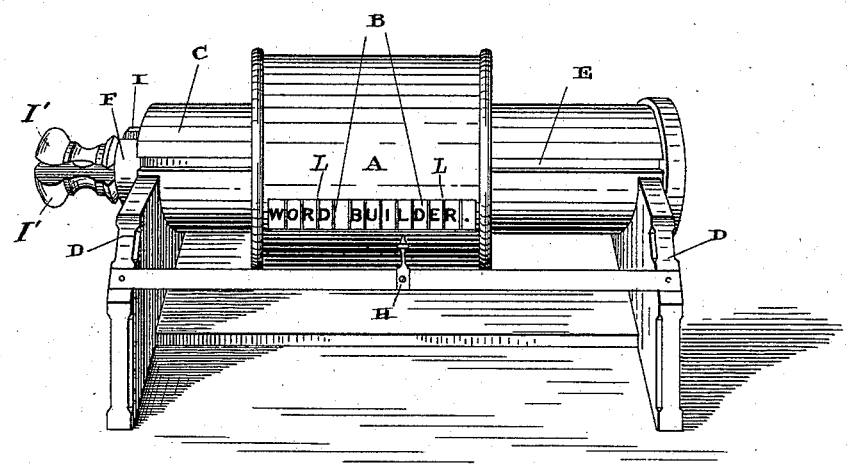
Figure 2:
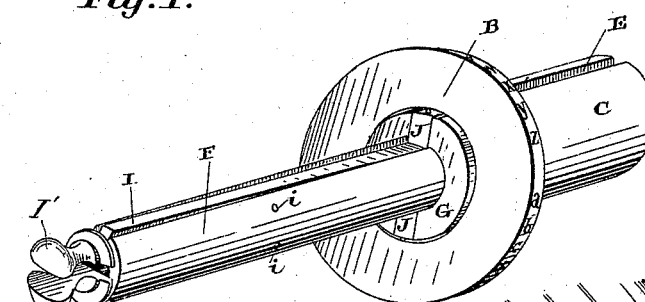
Figure 3:
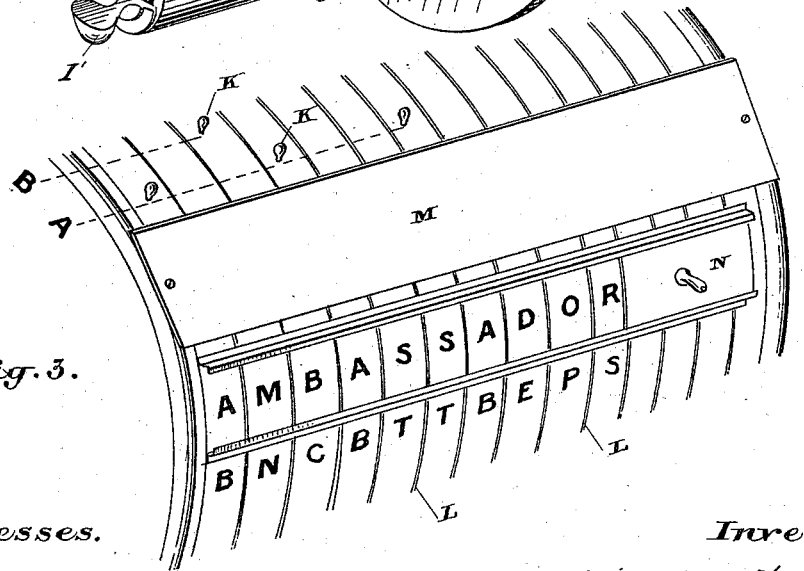

Figure 1 is a perspective view of my educational instrument, in which the disks or rings are contained within a casing having a longitudinal slot, so as to expose one letter on the periphery of each disk, the said disks being operated by dogs adjustably fitted to a spindle upon which the casing is held. Fig. 2 is a perspective view of one of the disks placed on the spindle immediately over the dogs used for operating it. Fig. 3 is a view showing the disk contained within a similar casing, but each disk being provided with an independent handle for turning it upon its pivot.

In the drawings, like letters of reference indicate corresponding parts in each figure; but as the construction exhibited in Figs. 1 and 2 is somewhat different from the construction shown in Fig. 3, I shall proceed to explain each figure by itself.

In Fig. 1, A is a casing arranged to contain the disks B, which disks are journaled on the cylinder C which is fixed to the bearing-plates D. The ends of the casing A have lips formed on them so as to project into the groove E, made in the cylinder C, so that the said casing will not revolve, but yet may be adjusted longitudinally upon the cylinder C to bring the desired disk over the collar G, which will be hereinafter described.

In Fig. 2, which is a detail of a portion of Fig. 1, the spindle F, which passes through the cylinder C, is shown. This spindle F has fixed to it the collar G, which is located at a point in the longitudinal length of the spindle, as indicated by the pointer H. (Shown in Fig. 1.) I are arms pivoted at *i*, and having fixed to one end of them the dogs J, which fit into slots made in the collar G. By pressing together the outer ends of the arms I the dogs J will be caused to expand, so as to press against and grip the disk B, which, as shown in Fig. 2, is located immediately over it. The disk B when so grasped may be turned around, and as the casing A is longitudinally adjustable upon the cylinder C, any one disk contained within the casing may be brought over the collar and thus acted upon, the pointer H indicating the location of the collar. Consequently any disk desired may be caused to revolve by bringing the said disk opposite to the pointer H and pressing together the outer ends, I', of the arms I. This plan for operating the disks will be found simple and effective; but in Fig. 3 I show analogous devices for effecting the same purposes. In Fig. 3 each disk has upon it a handle or knob, K, by which each disk may be turned on its common center without reference to the other disks. In order to enable each disk to be revolved without imparting motion to the others, I place between each two disks a washer, L, (see Fig. 1,) which I fix so that it will not revolve, consequently each disk has a dead stationary surface to revolve against. These washers may be connected to the casing A or held together in any other way, so that they will not revolve with the disks.

In Fig. 3, I show a slate or other marking-surface, M, located above the letters exhibited in the space or longitudinal opening extending across the peripheries of the disks. This slate is intended for the purpose of taking diacritical marks which the teacher may wish to apply to any particular letter, and which diacritical mark may be easily erased when it has performed its particular function. I also show in this figure a slide or blind, N, which is so arranged that it may be adjusted in order to cover the letters in the space either independently or collectively— that is to say, if the teacher wishes to teach a pupil a word of two syllables—for instance, "landlord"—he would adjust the slide N so as to cover the letters in the second syllable, and when the pupil has grasped the first syllable, "L, A, N, D," the slide can then be moved so as to expose the second syllable, "L, O, R, D," or each letter may be separately exposed. In the drawings I have shown the slate and slide in Fig. 3 only, owing to the smallness of Fig. 1; but it is obvious that they could also be attached to the casing shown in Fig. 1. If desired, two slides might also be used, the principle of the slide being simply intended to enable the teacher to expose the letters in the space, or rather to expose the letters between the lines forming the space, either independently or collectively.

In Fig. 3, I also show a plan for indicating on the outside of the casing the particular letter that will be exposed in the space when the handle attached to the particular disk or ring is brought opposite to a letter on the end of the casing. For instance, it will be noticed that on the disk on the left-hand side of the casing in Fig. 3, the letter "A" is exposed between the lines forming the space. It will also be seen that the handle K, which is fixed to it is opposite to the letter "A," on the end of the casing, and so on. Each handle or knob K should be provided with a pointer extending out to the fixed letters.

When it is desired, then, to bring any particular letter opposite to the space, the knob on the particular disk it is desired to move is seized and the pointer attached to its knob brought opposite to the letter on the end of the casing A. In this manner the different letters may be brought opposite to the opening without the necessity of watching until the particular letter comes opposite to the opening.

Although I have described my educational instrument merely for the purpose of manipulating the letters of the alphabet in order to build up different words, it will of course be understood that instead of the letters the numerals or other signs might be printed upon the disks B, and manipulated in the same manner. I therefore do not confine myself to any particular letters, nor do I confine myself to any particular form for the construction of my educational instrument, except as indicated in the claims; but What I do claim as my invention, and desire to secure by Letters Patent, is—

1. A series of disks pivoted independently, but on a common center, and having printed or otherwise marked on them the letters of the alphabet, numerals, or other signs, in combination with a covering adjustable lengthwise on said center and having an opening arranged to expose but one letter on each disk, whereby the letters or other marks, when brought before the opening, shall be read together, substantially as and for the purpose specified.

2. In combination with a suitable frame and a cylinder carried therein, a series of disks, each having a hole in its center to fit loosely onto said cylinder and centrally divided by a collar fixed to a spindle fitted within said cylinder, and dogs adjustably fitted to the spindle and actuated by mechanism whereby they can be thrown out beyond the periphery of the collar for the purpose of gripping the particular disk which may at the time be over the said collar, in order that the said disk will revolve when the spindle is turned on its axis.

3. A cylinder and a casing and a series of disks journaled on said cylinder and contained within said casing, which is so fixed to the cylinder that it will not revolve thereon, but constructed to move longitudinally on said cylinder, the said casing having a longitudinal opening made in it to expose one letter on each disk, the said disks being arranged to be revolved within the casing independently of one another, whereby the letters on the disks may be brought separately before the opening for the purpose of building up a word, substantially as and for the purpose specified.

4. A series of disks independently journaled on the cylinder C, within the casing A, having a longitudinal opening made in it, as specified, and means within the cylinder for longitudinally adjusting the casing on the cylinder, as described, whereby, by longitudinally adjusting the casing, the said mechanism can be caused to grip any disk desired, in combination with a fixed pointer situated to indicate the location of the gripping mechanism, substantially as and for the purpose specified.

5. A series of disks pivoted on a common center and having letters or other signs marked on their periphery, and means for independently revolving each disk to bring a single letter on one disk in conjunction with single letters on the other disks, the said letters so arranged being between two parallel lines extending across the disk, in combination with a slate or other marking-surface located above the letter so arranged for the purpose of taking diacritical marks.

Toronto, August 15, 1883.

WM. FORREST.

In presence of—
CHAS. C. BALDWIN,
LEWIS TOMLINSON.